United States Patent [19]

Merriman et al.

[11] 4,196,487

[45] Apr. 8, 1980

[54] EYEGLASS WASHER

[76] Inventors: Henry H. Merriman, 751 W. Washington, Jackson, Mich. 49203; William J. White, 4510 Broadway, Clark Lake, Mich. 49234

[21] Appl. No.: 958,343

[22] Filed: Nov. 6, 1978

[51] Int. Cl.² ............................................. G02C 13/00
[52] U.S. Cl. .................................. 15/104 R; 15/21 A; 215/286
[58] Field of Search ............. 15/95, 96, 104 R, 210 R, 15/21 A, 214; 215/285, 286

[56] References Cited

U.S. PATENT DOCUMENTS

| Re. 21,069 | 5/1939 | Pellegrini | 15/104 R |
|---|---|---|---|
| 421,804 | 2/1890 | Alexius | 15/104 R |
| 423,928 | 3/1890 | Howe | 215/286 |
| 517,410 | 3/1894 | Long | 215/285 |
| 886,075 | 4/1908 | Remington | 15/104 R |
| 2,802,228 | 8/1957 | Federighi et al. | 15/95 |

FOREIGN PATENT DOCUMENTS 1085060 7/1960 Fed. Rep. of Germany ............... 15/95

*Primary Examiner*—Edward L. Roberts
*Attorney, Agent, or Firm*—Beaman & Beaman

[57] ABSTRACT

The invention pertains to washers for eyeglasses, and is particularly suitable for cleaning safety glasses used in industrial and commercial locations. An elongated container capable of receiving eyeglasses in the folded condition includes a closed lower end and a lid adapted to seal the upper end in a liquid tight manner. A washing solution and soft pellets within the container clean the glasses upon shaking the container, and the container may be suspended from a lid attached supporting member wherein a downward force exerted on the container displaces the lid therefrom permitting access to the container interior.

6 Claims, 12 Drawing Figures

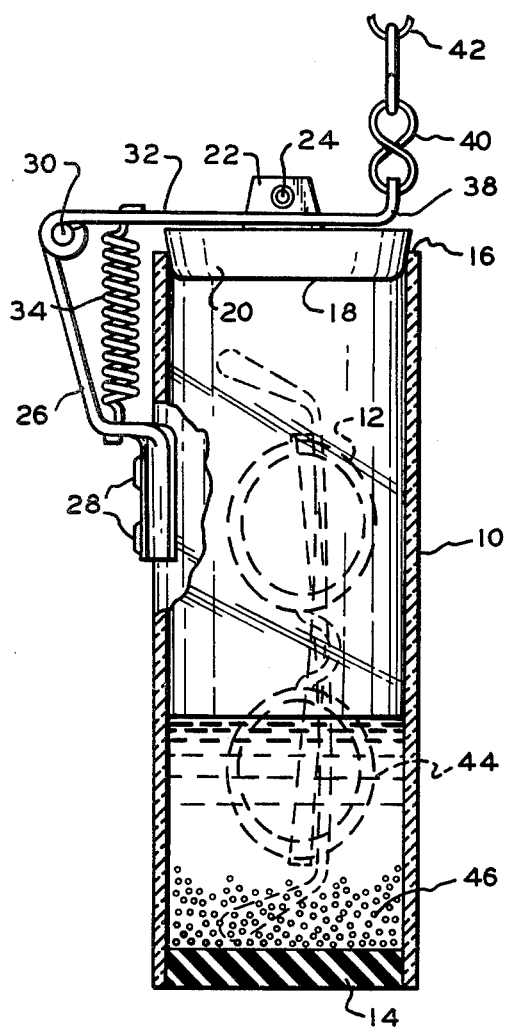
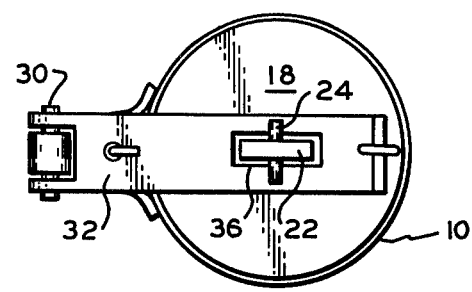
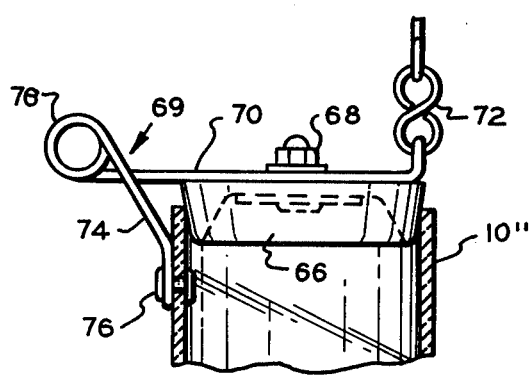
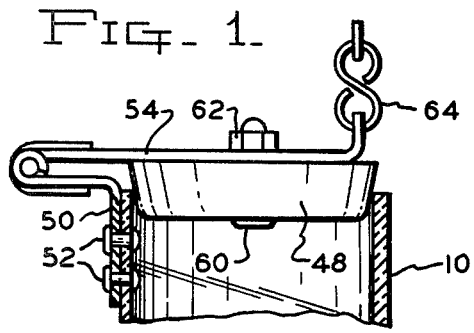
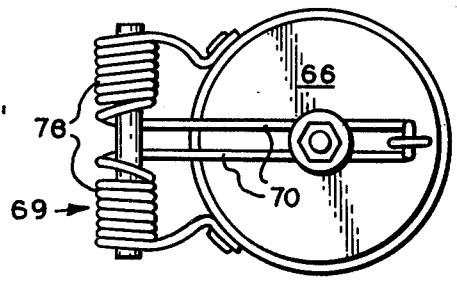
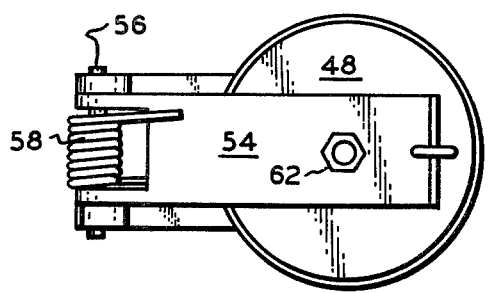
Fig. 1.
Fig. 2.
Fig. 3.
Fig. 4.
Fig. 5.
Fig. 6.

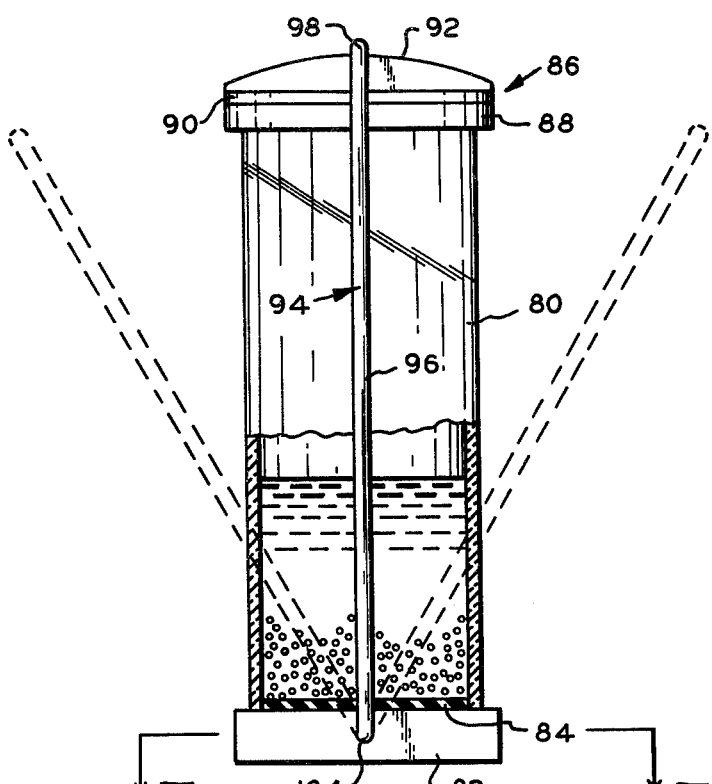
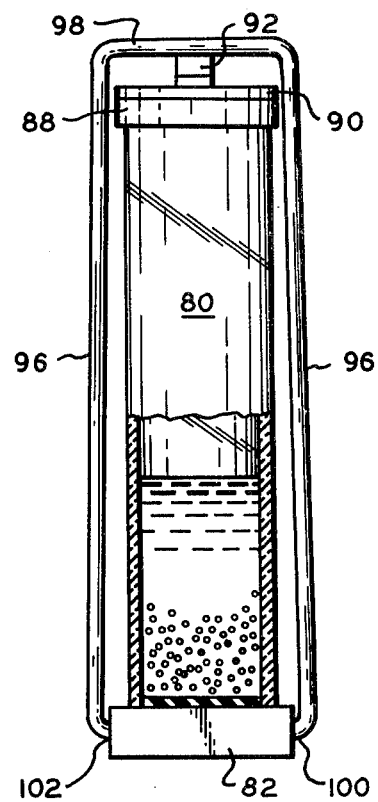
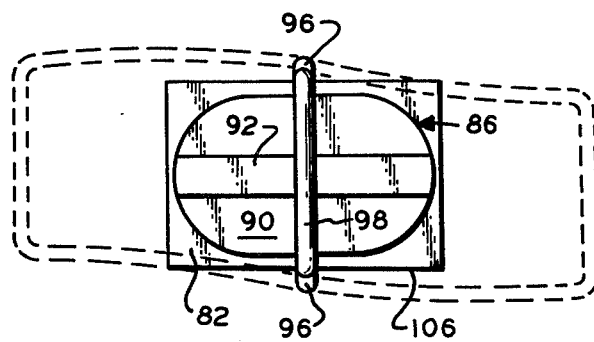
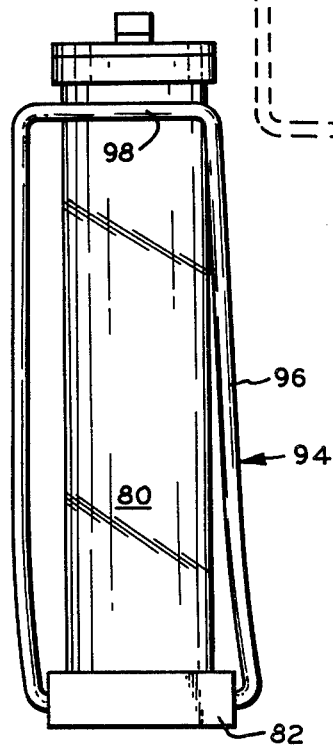
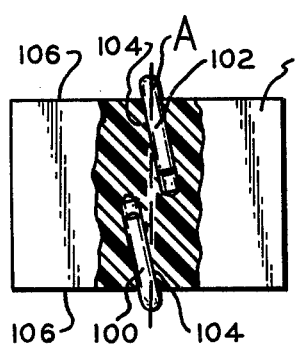
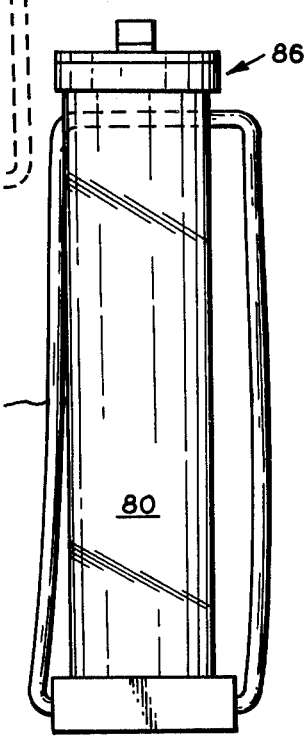

EYEGLASS WASHER

BRIEF DESCRIPTION OF THE INVENTION

The invention pertains to washers for eyeglasses utilizing a cleansing liquid and cleaning pellets located within an eyeglass receiving container.

Government safety regulations now require safety glasses in environments where danger to the eyes exists. Accordingly, safety glasses are now worn by many employees in factories and other similar industrial and commercial establishments. The cleaning of such safety glasses has become a problem in that many glasses are exposed to adverse environments which relatively quickly attract films and foreign matter to the lenses obscuring vision. Workers are often careless in keeping the safety glasses clean as a lens wiper or cleaner may not be readily available, and it is not uncommon for the visibility to be significantly impaired.

In the past, the cleaning of safety glasses usually consisted of providing wiping tissues or cloths, and the workers are encouraged to periodically wash the glasses under running water to maintain adequate vision. Unfortunately, many workers do not properly maintain the glasses as they do not want to be bothered with such maintenance, and the maintaining of clean safety glasses is a widespread problem.

While it is known to clean glass surfaces by the use of liquid and pellets, as is typified in U.S. Pat. No. 1,125,048, and while dentures have been cleaned by placing the same in a liquid solution containing pellets whereby shaking of the container would cause the pellets to scrub and clean the dentures, U.S. Pat. No. Re 21,069, to the applicant's knowledge an eyeglass cleaner has not heretofore been available which permitted the entire eyeglass, including lens and frames, to be readily cleaned by the utilization of a cleansing liquid and cleansing pellets, and it is an object of the invention to provide an eyeglass washer utilizing such features which is of a simple and readily usable condition.

An object of the invention is to provide an eyeglass washer particularly suitable for effectively cleaning the lens and frames of safety glasses wherein simple apparatus is used readily operable by the unskilled, and wherein damage to the eyeglasses is prevented.

A further object of the invention is to provide an eyeglass washer utilizing the scrubbing action of a plurality of soft pellets within a cleansing liquid wherein the confining container includes a removable lid capable of effectively sealing the container, yet providing "one hand" access to the interior thereof.

Yet an additional object of the invention is to provide an eyeglass washer employing an access lid wherein the washer is suspended from the lid such that a downward pull on the container permits the spring biased lid to be removed from the container opening simplifying the insertion and removal of eyeglasses with respect to the container.

Another object of the invention is to provide an eyeglass washer utilizing a lid held in place by a bail wherein the bail construction produces a biasing force toward the bail operative position.

The eyeglass washer in accord with the invention comprises an elongated container capable of receiving eyeglasses in the folded condition. The container includes a removable access lid, and a washing solution and cleaning pellets are located therein. Upon the insertion of the eyeglasses into the container the lid is replaced and the container shaken in a longitudinal direction to cause the liquid and pellets to scrub the lens and frames and thereby remove film and foreign matter therefrom.

In one embodiment of the invention the lid is pivotally mounted upon the container in a resiliently biased manner wherein the lid will normally be maintained in a closed sealed relationship upon the container access opening. Self-aligning means support the lid to assure an effective seal. The washer may be suspended from a flexible member, such as a light chain or cord, and the flexible member is preferably attached to the lid remote from its pivot whereby a downward pull on the container draws the container away from the lid "opening" the container to permit glasses to be inserted or removed. Such means of suspending the washer simplifies the use of the apparatus permitting one hand operation while minimizing the likelihood of spilling the cleansing liquid and pellets. In another embodiment of the invention, preferably for domestic use, the lid is maintained upon the container upper end by a bail engaging a cam defined upon the lid. The bail is biased toward a normal condition for engagement with the lid cam to facilitate handling and lid operation.

In both embodiments of the invention the container chamber receiving the eyeglasses includes cushioning means at each chamber end to reduce the likelihood of damaging the eyeglasses during cleaning. Such cushioning means may take the form of resilient pads or container ends, and the lid is preferably formed of a material capable of cushioning the eyeglass movement.

BRIEF DESCRIPTION OF THE DRAWINGS

The aforementioned objects and advantages will be appreciated from the following description and accompanying drawings wherein:

FIG. 1 is an elevational, partially sectional view of an embodiment of eyeglass washer in accord with the invention, FIG. 2 is a top plan view of the embodiment of FIG. 1, FIG. 3 is a detail, elevational, sectional view of another embodiment of eyeglass washer illustrating the upper end and lid construction, FIG. 4 is a top plan view of the embodiment of FIG. 3, FIG. 5 is a detail, elevational sectional view of another embodiment of eyeglass washer lid, FIG. 6 is a top plan view of the embodiment of FIG. 5, FIG. 7 is an elevational view of an additional embodiment of eyeglass washer in accord with the invention, FIG. 8 is an end elevational view of the embodiment of FIG. 7, FIG. 9 is a top plan view of the embodiment of FIGS. 7 and 8, FIG. 10 is a sectional view taken through the washer base along Section X—X of FIG. 7, FIG. 11 is an end view of the embodiment of FIGS. 7 and 8 illustrating the condition of the bail when pivoted towards the viewer, and FIG. 12 is a view similar to FIG. 11 illustrating the condition of the bail when pivoted away from the viewer.

DESCRIPTION OF THE PREFERRED EMBODIMENTS

As apparent in FIG. 1, an eyeglass washer in accord with the invention includes a container or receptacle 10 of elongated form and sufficient dimension to receive folded eyeglasses 12. The container 10 may be formed of a variety of materials, preferably a synthetic plastic, and may be of a transparent plastic such as Plexiglas or the like. In the embodiment of FIG. 1 the lower end of the cylindrical container is sealed by disc 14 formed of an elastic material such as rubber, neoprene, etc. The upper end of the container 10 is open adjacent end edge 16.

The open end 16 is selectively sealed by a lid or cover 18 which is preferably formed of a resilient material such as rubber or neoprene, and includes a tapered surface 20 adapted to sealingly engage the edge 16 in a liquid type relationship. The lid includes an upwardly extending boss 22 through which the pin 24 is inserted for attaching the lid to its supporting bracket.

The lid supporting bracket includes a bracket member 26 which is connected to the side of the container 10 by screws or rivets 28. The bracket 26 includes a hinge 30 which serves to pivotally support the arm 32 upon a hinge pin. The arm 32 extends over the open end of the container and is biased toward the container by tension spring 34 disposed between bracket 26 and arm 32. The arm includes a rectangular opening 36, FIG. 1, which loosely receives the lid boss 22 wherein the lid may move in a horizontal direction with respect to the arm to permit self-aligning and self-centering of the lid 18 upon the container edge 16 due to the tapered configurations of the lid surface 20. The arm includes an upwardly turned end 28 receiving S-ring 40 whereby a chain 42 may be attached to the S-ring for suspended support of the eyeglass washer.

The eyeglass washer is approximately one-quarter or one-third filled with a cleansing liquid 44 such as those available for cleaning window glass, mirrors, and the like. Such liquid may consist of an ammonia and water mixture. Also, the container 10 includes a plurality of cleansing pellets 46, which, preferably, have a higher specific gravity than the cleansing liquid 44. Preferably, the pellets 46 are formed of nylon and of a cube configuration wherein a plurality of linear "scraping" edges exist upon each pellet. However, the pellets may be round, and may also be formed of a soft metal or material, such as lead.

In use, the washer is suspended by the member 42, which will usually be twelve or fifteen inches in length, and the spring 34 produces sufficient force to maintain the lid 18 in a sealed relationship to the container edge 16 against the weight of the washer. The washer is stored in this condition, and the sealing of the container prevents the loss of cleansing liquid due to evaporation, and also prevents contamination.

To use the washer the user grasps the container body 10 with one hand and pulls downwardly against the influence of the spring 34. This downward force will pull the container away from the lid 18 which pivots upwardly and access to the container through the upper open container end is possible. The operator then places the folded eyeglasses 12 into the container, and the eyeglasses will drop and engage the closed lower end 14 as shown in FIG. 1. The operator then raises the container permitting the spring 34 to pivot the lid into a sealed relationship to the edge 16, and the user then shakes the container up and down in a direction substantially parallel to the container length. Shaking of the container causes the cleansing fluid 44 to slosh back and forth over the lens and frames, and the pellets 46 become dispersed throughout the liquid and scrub against the lens and frames during the container movement. This agitation of the liquid, and the cleansing action of the pellets as they engage the eyeglass components, produces an effective cleansing operation, and ten seconds of shaking will adequately clean most safety eyeglasses. Of course, the duration of shaking is directly related to the degree of cleansing required.

After the container shaking ceases the operator pulls downwardly on the container to pull the lid away from the edge 16 and removes the eyeglasses. The eyeglasses may be permitted to dry in the air without wiping, or may be wiped upon clean tissues or cloth.

A variation of lid supporting bracket is shown in FIGS. 3 and 4. In this embodiment the lid 48 is supported upon a bracket portion 50 riveted at 52 to the container side which is hinged to portion 54 through pivot pin 56. A torsion spring 58 surrounds the pivot pin, and one end of the spring engages portion 50, while the other end engages portion 54. The spring 58 biases the portion 54 in a clockwise direction to maintain the lid 48 sealed upon the container 10'.

The lid 48 is attached to the portion 54 by a self-aligning arrangement through stem 60 and nut 62, and the upturned end of the bracket portion 54 includes the supporting member 64 attached thereto. The operation of this embodiment is identical to that described above with respect to FIGS. 1 and 2.

A further lid supporting arrangement is illustrated in FIGS. 5 and 6 wherein the resilient lid 66 is mounted by means of a self-aligning stem and nut arrangement 68 to a torsion spring assembly 69 including end portion 70 to which the lid is bolted, and the supporting member 72 affixed. The spring 69 also includes ends 74 which are riveted at 76 to the container sides, and as will be appreciated from FIG. 6, the spring actually consists of a pair of oppositely wound torsion coils 78, and the operation of this lid supporting structure will be identical to that described above with respect to FIGS. 1 and 2.

It is contemplated that the aforedescribed embodiments wherein the washer is suspended by a chain will be utilized in industrial and commercial installations, such as factories, foundries, shops and the like where "one hand" operation is important, as is the need to prevent theft and misplacement. However, the invention is suitable for cleaning eyeglasses, whether of the safety or reading type, and the embodiment illustrated in FIGS. 7-12 is particularly suitable for non-industrial use.

In the embodiment of FIGS. 7-12 the container 80 is formed of a plastic material, such as transparent Plexiglas, and may be of an oval or elliptical cross section to permit accomodation of glasses having large lenses, as is often the case with sunglasses. The lower end of the container is sealed by a synthetic plastic base member 82, and a resilient cushion 84 formed of rubber or neoprene, is located within the container adjacent the base.

The upper end of the container 80 is sealed by lid 86 which includes a lower resilient pad 88 for producing a liquid tight engagement with the container edge, and the lid also includes a rigid upper portion 90 including the convex cam surface 92.

The lid 86 is maintained upon the container edge by a wire bail 94 which includes elongated leg portions 96 interconnected at their upper ends by the wire portion 98 adapted to engage the lid cam 92. The lower ends of the leg portions 96 include linear hinge portions 100 and 102 disposed at right angles to the length of the associated leg portion.

The hinge portions 100 and 102 are obliquely related to the projection of the base portion 98 and the shortest distance interconnecting the lower edges of the leg portions as represented at A, FIG. 10. This obliqueness is in the neighborhood of 10° from the distance A between the bail leg portions.

The container base 82 is also provided with a pair of obliquely oriented bores 104 adapted to closely yet rotatably receive the hinge portions 100 and 102. Bores 104 are obliquely disposed to the lateral sides 106 of the base approximately 10° from a line interconnecting the locations of the intersections of the bores 104 and the associated base sides 106. The hinge portions 100 and 102 are received within the bores 104, and as will be appreciated from FIGS. 7-9, the base portion 98 will engage the convex cam surface 92.

In use, the bail 94 is removed from the cam surface 92 to either of the dotted line positions shown in FIG. 7, permitting the lid 86 to be removed from the container 80 and eyeglasses deposited therein. Thereupon, the lid is replaced, and the bail 94 moved to the position of FIG. 1 wherein the base portion 98 engages the "highest" cam portion to tightly and sealingly maintain the lid upon the container. The container may then be shaken, and the cleansing liquid and cleaning pellets located therein will efficiently clean the eyeglasses. After cleansing, the user displaces the bail laterally from the cam 92, removes the lid 86 and removes the eyeglasses from the container.

The oblique orientation of the bail hinge portions 100 and 102, and the bores 104, produces a biasing force upon the bail when it is laterally displaced from the central position shown in FIGS. 7-9, such as illustrated in the dotted lines in FIG. 7. Thus, the biasing force produced on the bail tends to maintain the bail base portion 98 above the container 80 making the bail readily available to the user and prevents the bail from "falling" to a position difficult to retrieve. This "spring" action of the bail facilitates one-hand use of the container and simplifys handling of the washer.

In FIGS. 11 and 12 the forces produced in the bail 92 to achieve the biasing action on the bail will be appreciated. As will be apparent from FIG. 11, when the bail is displaced toward the viewer the leg portions 96 have forces imposed thereon tending to bend the leg portions to the left, while when the bail is pivoted away from the viewer, FIG. 12, the bending forces imposed on the leg portions tend to deform the leg portions to the right. Of course, the oblique orientation of the bores 104 and hinge portions prevents the bail from moving in a direction parallel to the base lateral sides 106, but the deviation from such a direction of movement is not of such degree as to interfere with the displacement of the bail past the container 80. And the aforedescribed bail construction permits the bail to be biased toward its central position regardless of the direction of bail displacement from such central position.

It is appreciated that various modifications to the inventive concepts may be apparent to those skilled in the art without departing from the spirit and scope of the invention.

We claim:

1. Eyeglass washer apparatus comprising, in combination, an elongated, transparent container adapted to closely receive a pair of eyeglasses in the folded condition, said container including a closed lower end and an upper end, a closure mounted upon said container upper end adapted to selectively sealingly close said upper end, a resilient pad mounted upon said closure adjacent said upper end, a convex cam defined on said closure, a cleansing liquid within said container, a resilient pad within said container adjacent said closed lower end, a bail pivotally mounted on said container at said closed end movable between an operative position engaging said closure cam and an inoperative position removed from said closure cam and a plurality of small cleaning pellets within said container adapted to scrub the eyeglasses upon shaking said container in a longitudinal direction.

2. In an eyeglass washer apparatus as in claim 1 wherein said pellets are formed of a synthetic plastic material.

3. In an eyeglass washer apparatus as in claim 2 wherein said pellets comprise polygonal shapes having linear edges.

4. In an eyeglass washer apparatus as in claim 2 wherein the specific gravity of said pellets is greater than the specific gravity of said cleansing liquid.

5. In an eyeglass washer apparatus as in claim 1 wherein said pellets are formed of a soft metal.

6. Eyeglass washer apparatus comprising, in combination, an elongated container adapted to closely receive a pair of eyeglasses in the folded condition, said container including a closed lower end and an upper end, a closure mounted upon said container upper end adapted to selectively sealingly close said upper end, a cleansing liquid within said container, a plurality of small cleaning pellets within said container adapted to scrub the eyeglasses upon shaking said container in a longitudinal direction, said closure including a cam surface, a base defined on said container adjacent said closed end, a bail pivotally mounted on said container movable between an operative position engaging said closure cam and an inoperative position removed from said closure cam, said bail including a pair of spaced elongated elements located on opposite sides of said container and each having first and second ends, said elements being interconnected at said second ends by a cam engaging portion, an elongated hinge portion defined at each element's first end transversely disposed to the length of the associated element, said hinge portion being obliquely disposed to a line intersecting said element's first ends and substantially parallel to each other, en elongated socket defined in said base on opposite sides of said container each pivotally closely receiving an element hinge portion, said sockets being oriented complimentary to the orientation of said hinge portion.

* * * * *